Figure 1:
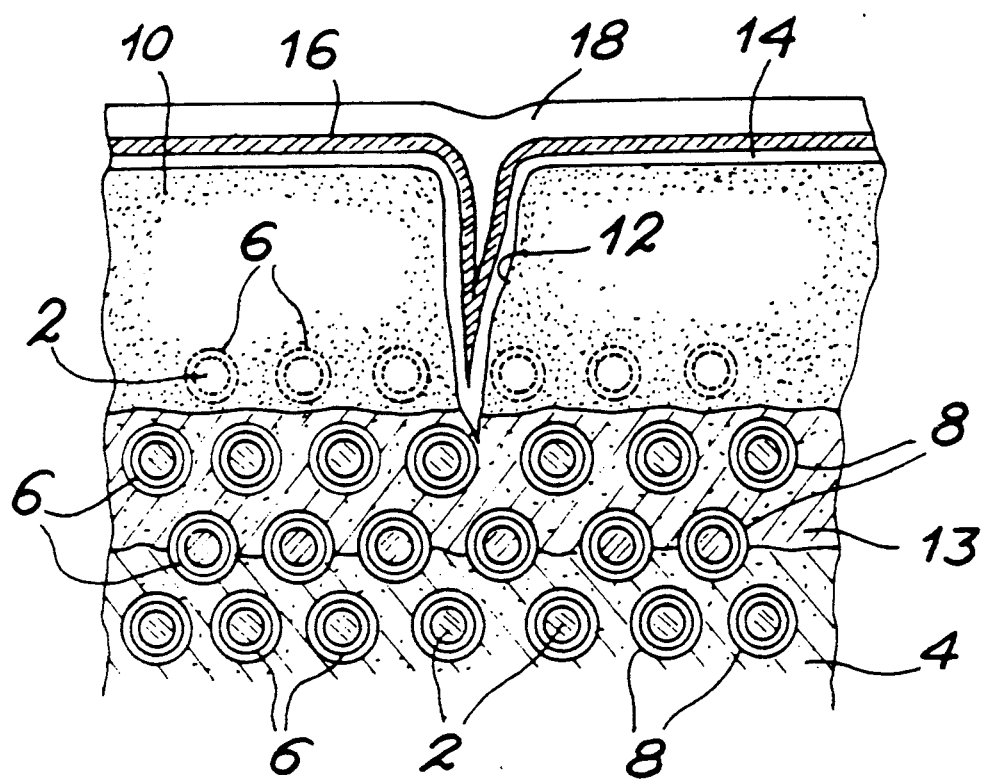

United States Patent [19]

Rousseau

[11] Patent Number: 5,051,300

[45] Date of Patent: * Sep. 24, 1991

[54] COMPOSITE MATERIAL WITH CARBON REINFORCING FIBERS AND ITS PRODUCTION PROCESS

[75] Inventor: Gérard Rousseau, Saint Aubin de Medoc, France

[73] Assignee: Societe Nationale Industrielle et Aerospatiale, Paris Cedex, France

[ * ] Notice: The portion of the term of this patent subsequent to Sep. 5, 2006 has been disclaimed.

[21] Appl. No.: 394,020

[22] Filed: Aug. 15, 1989

[30] Foreign Application Priority Data

Aug. 31, 1988 [FR] France ................. 88 11401

[51] Int. Cl.⁵ ................. B32B 7/00
[52] U.S. Cl. ................. 428/245; 428/246; 428/294; 428/323; 428/365; 428/378; 428/408; 428/699; 428/702; 428/902
[58] Field of Search ........... 428/408, 902, 323, 246, 428/245

[56] References Cited

U.S. PATENT DOCUMENTS

| 3,019,128 | 1/1962 | Smiley | 117/71 |
|---|---|---|---|
| 4,500,602 | 2/1985 | Patten | 428/408 |
| 4,671,997 | 6/1987 | Galasso | 428/408 |
| 4,766,013 | 8/1988 | Warren | 427/228 |
| 4,859,503 | 8/1989 | Bouix et al. | 427/249 |
| 4,863,773 | 9/1989 | Rousseau et al. | 428/68 |
| 4,863,798 | 9/1989 | Arenz et al. | 428/368 |
| 4,877,705 | 3/1988 | Polidor | 428/34.6 |
| 4,950,558 | 8/1990 | Sarin | 428/698 |

FOREIGN PATENT DOCUMENTS

| 0106817 | 4/1984 | European Pat. Off. . | |
| 0121797 | 10/1984 | European Pat. Off. . | |
| 0200991 | 12/1986 | European Pat. Off. . | |
| 0069283 | 6/1981 | Japan | 428/408 |
| 3216980 | 9/1988 | Japan | 428/408 |
| 8400924 | 3/1984 | PCT Int'l Appl. | 428/408 |

OTHER PUBLICATIONS

Chemical Abstracts, vol. 91 (Drozniak).

Primary Examiner—Paul J. Thibodeau
Assistant Examiner—Robert J. Follett
Attorney, Agent, or Firm—Pearne, Gordon, McCoy & Granger

[57] ABSTRACT

The composite material according to the invention has carbon reinforcing fibres (2) coated with a carbon coating (6) and then a SiC coating (8), embedded in a carbon-based matrix, covered by an outer silicon carbide layer (10), sealed by a silicon carbide coating (14), then an aluminium or hafnium nitride coating (16) and finally an outer alumina coating (18). This stainless material can be used as a heat shield for space shuttles.

18 Claims, 2 Drawing Sheets

COMPOSITE MATERIAL WITH CARBON REINFORCING FIBERS AND ITS PRODUCTION PROCESS

DESCRIPTION

The present invention relates to a composite material of the carbon-carbon type made stainless up to a temperature of 1800° C., under a low air pressure, as well as to its production process.

This composite material is more particularly intended for use as a high performance heat protection for space vehicles (shuttles or aircraft) having to resist heating caused by the friction of the air when they reenter the atmosphere at high speed.

However, the invention is also applicable to other industrial fields requiring the use of structures able to resist high mechanical stresses under temperature above 1100° C. in a corrosive medium. This is particularly the case with improved efficiency turbine engines operating at high temperatures (between 1300° and 1400° C.) and certain industrial heat recuperators.

The major problem of carbon-carbon type composite materials is their oxidation in air at high temperature causing the carbon to be converted into CO or $CO_2$, so that the composite material is deteriorated and even destroyed. To prevent said oxidation, different processes have already been considered with regards to the protection of the carbon-containing materials and based on the use of a silicon carbide (SiC) coating formed on the outer surface of the composite material parts.

This outer SiC coating can be obtained by conversion into a silicide or siliciding the carbon of the outer portion of the material. Siliciding is carried out by pack cementation, as described in U.S. Pat. No. 3,095,316, or by chemical vapour phase deposition (CVD/CVPD). The deposition of SiC by CVD can be carried out by depositing a silicon coating on the outer portion of the material and then melting the silicon in order to ensure its diffusion into the material and its reaction with the carbon of the latter to form the SiC, as described in U.S. Pat. No. 3,406,044 and U.S. Pat. No. 3,925,577.

This outer SiC coating can also be obtained directly by SiC deposition based on the cracking of chlorosilane vapours, either alone or combined with hydrogen or hydrocarbons, as described by the article by S. Audisto in Actualité Chimique, September 1978, pp 25-33.

Other methods combine the siliciding of the surface carbon of the composite material with a chemical vapour phase deposition (cf. U.S. Pat. Nos. 3,406,044, 4,425,407 and 4,476,178).

All the aforementioned methods for producing a SiC coating on carbon-carbon type composite materials lead to the obtaining of a cracked coating as a result of the variation in the expansion coefficients between the carbon and the silicon carbide. Moreover, in order to obviate this disadvantage, with the outer SiC coating has been combined a silica coating for sealing the cracks of the SiC coating (cf. "Weight uncertainty analysis for space shuttle reinforced carbon-carbon" Sawepaper 1275-37th Annual Conference 8-10 May 1978).

In order to improve the sealing of the cracks of the SiC coating, consideration has also been given to the use of a coating based on SiC powder and a sodium silicate-based glass, to which may optionally be added sodium borate, or based on aluminium phosphate and alumina powder, as described in U.S. Pat. Nos. 4,500,602 and 4,565,777. The object of these glasses is to lower the temperature from 1200° to 1300° C. to 800° C. as from which the sealing of the cracks of the SiC coating becomes effective.

The same type of result is obtained by adding boron during the formation of the SiC coating by pack cementation (cf. U.S. Pat. No. 4,476,164). The glass which forms naturally on the SiC heated in air, e.g. during the reentry of space vehicles into the atmosphere, is a borosilicate with a lower melting point than silicon dioxide.

Finally, the sealing of the outer SiC coating by silicon dioxide and then by a glass based on silicate and borate is in particular described in EP-A-133 315 (U.S. Pat. No. 4,863,773).

Therefore all the above protections are based on the use of an outer SiC coating completed by silica glasses associated with $B_2O_3$, $Na_2O$ and $P_2O_5$.

These protections operate correctly up to temperatures of approximately 1700° C. at atmospheric pressure. However, under reduced pressure, the operating temperature of these materials is limited by the reaction of the silica ($SiO_2$) on the silicon carbide corresponding to the following equation:

$$SiC + SiO_2 \rightarrow 2SiO + CO$$

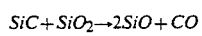

Thus, the vapours of silicon monoxide and carbon monoxide produced perforate the viscous silica coating when the pressure produced exceeds that of the external atmosphere, namely:

2.9 KPa at 1500° C.
10 KPa at 1600° C.
32.6 KPa at 1700° C.
92.0 KPa at 1800° C.

These conditions are those of silica alone. The invention relates to a composite material with carbon reinforcing fibres coated with an outer silicon carbide layer sealed by a material able to withstand higher temperatures under reduced pressures, such as 1800° C. under 2.8 KPa or 2000° C. under 20 KPa.

In particular, the material according to the invention can be used for equipping certain more stressed areas of space vehicles such as the nose, the ailerons and the leading edges, whereas the other parts of such vehicles can be constructed in accordance with the prior art.

More specifically, the invention relates to a composite material having a substrate of carbon fibres embedded in a matrix, an outer silicon carbide layer and a covering of said outer layer, characterized in that the covering comprises an outer coating of an oxide chosen from among $ThO_2$, $ZrO_2$, $HfO_2$, $La_2O_3$, $Y_2U_3$ and $Al_2O_3$ and an intermediate coating of a compound not containing silicon serving as a reaction barrier between the silicon carbide and the oxide.

The object of the oxide is to prevent, under high temperature and reduced pressure, the passage of oxygen as a result of its good sealing and high refractory characteristics.

Preferably, use is made of alumina due to the fact that it has a better diffusion coefficient than oxygen. The diffusion coefficient of oxygen in alumina at 1200° C. is $3.10^{-16}$ cm$^2$/s, i.e. 100 times lower than that of silica which is $3.10^{-14}$ cm$^2$/s.

Any material which substantially is nonreactive with silicon carbide and the aforementioned oxides and which has a good adhesion to the latter can be used as the intermediate layer. To this end, reference is made to carbides, nitrides, borides and even certain noble metals (Ir). Preference is given to the use of nitrides, carbides and borides such as HfC, TaC, ZrC, $W_2C$, NbC, $ThC_2$, $ZrB_2$, $HfB_2$, $TiB_2$, BN, HfN, ZrN, AlN; as well as certain noble metals of the platinum type such as Pt, Ir, Os, Rh and Ru.

The invention also relates to a composite material having a substrate of carbon fibres embedded in a matrix, an outer silicon carbide layer and a covering of the outer layer, characterized in that the covering comprises an outer oxide coating and an intermediate coating not containing silicon/serving as a reaction barrier between the silicon carbide and the oxide, said intermediate coating being chosen from among HfC, TaC, ZrC, $W_2C$, NbC, $ThC_2$, $ZrB_2$, $HfB_2$, $TiB_2$, BN, HfN, ZrN, AlN, Pt, Ir, Os, Rh and Ru.

The term compound not containing silicon is understood to mean a compound which does not intentionally contain silicon. In particular, the barrier layer is not silicon or a nitride, or a carbide, or a boride of silicon. In addition, the oxide coating is not of SiO or $SiO_2$.

The use of an outer alumina coating and an intermediate coating according to the invention permits a gain of 300° C. at comparable pressure compared with a prior art system with silica glass only. Thus, these systems make it possible to lower the total pressure of the gases at the interface with $Al_2O_3$. For example, these compounds have pressure values at 1800° C. as indicated below:

| Interface | Pressure at 1800° C. |
| --- | --- |
| ZrC | 2.25 KPa |
| $ZrB_2$ | 0.11 KPa |
| HfC | 2 KPa |
| HfN | 2 KPa |
| TaC | 1.2 KPa |
| $W_2C$ | 0.29 KPa |
| $TiB_2$ | 0.06 KPa |
| BN | 1 KPa |
| AlN | 2.7 KPa |

More particularly with $AlN$-$Al_2O_3$, at different temperatures, the following pressure values are obtained:
less than 0.1 KPa at 1500° C.,
0.72 KPa at 1700° C.,
2.8 KPa at 1800° C.,
9 KPa at 1900° C.,
20 KPa at 2000° C.

The use of an intermediate hafnium nitride coating is slightly more favourable than an aluminium nitride coating. Thus, at 1800° C. the pressure is 2 KPa. However, the expansion coefficient of hafnium nitride is slightly less favourable than that of AlN, namely $6.2 \cdot 10^{-6}$/°C. in place of $4.10^{-6}$/°C.

The outer silicon carbide layer formed at high temperature and with a thickness of at the most 600 micrometers and which covers all the outer surfaces of the composite material ensures the sealing of the latter with respect to the penetration of oxidizing gases and in particular oxygen. As this layer is cracked, effective sealing of the cracks of the said outer layer can take place with silicon carbide at low temperature between the barrier layer and the outer SiC layer.

The composite material matrix can be of vitreous carbon or graphite, optionally doped with finely divided silicon carbide. In the latter case, the matrix contains at the most 20% by weight silicon carbide and preferably 2 to 10% by weight thereof. This low SiC proportion in the matrix, whilst still ensuring an effective anti-oxidation protection, in no way modifies the physical properties of said carbon matrix.

The invention also relates to a process for the production of a composite material as defined hereinbefore. Thus, according to a main feature, said process comprises the following stages:

(a) formation of a deformable porous substrate constituted by carbon fibres, (b) shaping the substrate, (c) densification of the shaped substrate for forming the matrix, (d) covering the outer surface of the matrix by an outer silicon carbide layer, (e) deposition of an intermediate coating not containing silicon serving as a reaction barrier between the silicon carbide and an oxide, (f) covering the outer layer by an external coating of an oxide chosen from among $ThO_2$, $ZrO_2$, $HfO_2$, $La_2O_3$, $Y_2O_3$ and $Al_2O_3$.

The invention also relates to a process for the production of a composite material having a substrate of carbon fibres embedded in a matrix, characterized in that it comprises the following stages:

(a) formation of a deformable porous substrate constituted by carbon fibres, (b) shaping the substrate, (c) densification of the shaped substrate for forming the matrix, (d) covering the outer surface of the matrix by an outer silicon carbide layer, (e) deposition of an intermediate coating serving as a reaction barrier between the silicon carbide and an oxide, said intermediate coating being chosen from among HfC, TaC, ZrC, $W_2C$, NbC, $ThC_2$, $ZrB_2$, $HfB_2$, $TiB_2$, BN, HfN, ZrN, AlN, Pt, Ir, Os, Rh and Ru.

(f) covering the outer layer by an oxide coating not containing silicon.

The fibrous substrate of the composite material can be formed by graphite or carbon fibres obtained from any random precursor and in particular from polyacrylonitrile (PAN), pitch or rayon. Moreover, as a function of the sought final properties for the composite material, said fibres can be short or long, with a high strength or high modulus and may have undergone graphitization treatments. The fibrous substrate is obtained by weaving or filamentary winding of carbon fibres in one, two, three or N directions.

According to a preferred embodiment of the inventive process, the outer silicon carbide layer is formed by siliciding the outer surface of the densified structure. This siliciding makes it possible to form a SiC coating which adheres perfectly to the matrix. In particular, siliciding is performed by pack cementation, i.e. the material to be silicided is immersed in a mixture of powders which, by heating, gives off vapours of the siliciding species, which are silicon and/or silicon monoxide.

The power mixtures usable for supplying silicon and SiO are constituted by silicon carbide and at least one random oxide able to react with the silicon carbide to form silicon monoxide. The oxide used is in particular silica or alumina.

With a $SiC + SiO_2$ mixture at about 1650° C. SiO is formed and at about 1800° C. a mixture of SiO vapours and silicon. Optionally, it is possible to add to said mixture a silicon carbide excess in order to dilute the reactive elements and therefore prevent the silica from agglomerating the mixture during melting. The silica level can be such that it is entirely consumed.

With a SiC+Si+Al₂O₃ mixture, vapours of silicon and SiO are obtained with a definite preponderance of silicon vapours. This mixture generally contains 8 to 10% by weight alumina, 25 to 35% by weight silicon and 55 to 60% by weight silicon carbide.

The choice of the powder mixture is a function of the nature of the composite material used. With only slightly dense materials constituted by slightly graphitized fibres and a vitreous matrix (or slightly graphitized matrix), the preferred mixture is SiC+Si+Al₂O₃, which in principle contains 50 to 75% by weight SiC and 50 to 25% by weight SiO₂.

This difference is linked with the siliciding reactions implied with each of the siliciding vapours. With silicon, there is Si+C→SiC and with silicon monoxide SiO+2C→+CO. These equations indicate that the volume variation is half as large with silicon as with SiO.

For example, a composite material of density 1.4 has an expansion or swelling of 1.45 with silicon and 0.73 with SiO. In the latter case, the layer would be porous and a mixture of silicon vapours and SiO vapours is preferably used.

Surface siliciding of the composite material is carried out in the presence of a neutral gas such as helium, argon, etc.

The duration of the immersion of the densified structure in the powder mixture at the chosen temperature makes it possible to fix the thickness of the SiC coating, the latter having a thickness between 200 and 600 μm.

Siliciding makes it possible to form a 200 to 600 μm thick SiC surface layer, as well as an underlying carbon/silicon carbide composite layer of 40 to 200 μm, resulting from the preferred siliciding of the carbon of the matrix, the carbon of the fibres only being partly silicided. This underlying layer ensures a good adhesion of the outer SiC layer to the carbon of the matrix, thus preventing any separation from the outer layer.

As a result of difference between the expansion coefficients of the carbon of the matrix and the SiC of the outer layer, the latter is cracked.

It is also possible to consider a sealing of these cracks with silicon carbide directly deposited by chemical vapour phase deposition and therefore at temperatures lower than for siliciding (i.e. 600° to 1000° C.), thus improving the sealing of the protection at low temperature. Plasma-assisted CVD deposition permits sealing at about 600° C.

These chemical vapour phase deposits take place by the cracking of one or more organosilanes substituted or not by a halogen with which is optionally associated one or more gaseous hydrocarbons and/or hydrogen.

The organosilanes which are usable are in particular chlorosilanes of the form $(CH_3)_n SiCl_{(4-n)}$ with $0 \leq n \leq 4$. Reference is e.g. made to trichloromethyl silane, tetramethyl silane and dichlorodimethyl silane. The hydrocarbons which can be used are in particular methane, ethane, propane and butane. Preference is given to the use of the gaseous mixture containing trichloromethyl silane and hydrogen in a ratio of $[H_2]:[CH_3SiCl_3] 4:12$.

However, other mixtures can be used, such as trichloromethyl silane in the presence of butane and hydrogen in the ratios: $[H_2]:[CH_3SiCl_3] 1:8$ and $[C_4H_{10}]:[CH_3SiCl_3] 1:5$, or trichloromethyl silane alone.

Temperatures of 600° to 1000° C. and pressures of 0.5 to 10 KPa are fixed so as to permit a good diffusion of the gases and a deposition at the bottom of the cracks.

The thickness of the SiC deposited by CVD varies from 2 to 10 μm. This thickness is sufficient for closing the cracks of the outer SiC layer and the porosities of the carbon at the bottom of the crack, which makes the protection tight even at low temperature (as from 600° C.).

According to the invention, it is possible to deposit the outer SiC layer by CVD from the above gaseous mixtures, at pressure and temperatures higher than those used for sealing by SiC (typically 1100° C. and 10 KPa).

According to the invention, it is possible to use all known methods for depositing a barrier layer between the outer SiC layer and the oxide, such as alumina. In the particular case of aluminium nitride, the nitride coating can easily be deposited by CVD at about 950° C. and therefore under conditions identical to those of the SiC used for sealing. Moreover, this material has an expansion coefficient close to that of SiC. In addition, AlN deposition is preferably carried out by CVD. Chemical vapour phase deposition of aluminium nitride takes place under a reduced pressure between 0.5 and 10 KPa and with scavenging of a neutral gas such as helium or argon.

Other alumina nitride deposition methods, such as the nitriding of an alumina layer, or physical vapour phase deposition (PVD) are also usable. Thus, PVD methods, such as reactive cathodic sputtering, reactive evaporation and aluminium nitride spraying makes it possible to obtain thin aluminium nitride films. However, these methods suffer from the disadvantage of supplying coatings at low temperatures (close to ambient temperature), which are therefore highly compressed during their use at high temperature.

No matter what the method used for aluminium nitride deposition, the latter has a thickness of 0.5 to 5 μm.

For the same reasons as given hereinbefore for aluminium nitride, it is possible to deposit a hafnium nitride coating, in place of AlN, by CVD or PVD.

According to the invention, the outer alumina layer is deposited in alpha form by CVD and in particular by gaseous phase hydrolysis of the aluminium chloride. The hydrolysis water is formed in situ in the reactor by the reaction of carbon dioxide gas on hydrogen. The following reactions are involved:

$3CO_2 + 3H_2 \rightarrow 3CO + H_2O$

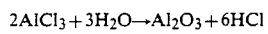

$2AlCl_3 + 3H_2O \rightarrow Al_2O_3 + 6HCl$

The reaction is essentially governed by the production of the water responsible for the hydrolysis of the aluminium chloride. Deposition takes place with a partial hydrogen to carbon dioxide gas ratio close to 1.

The temperature and the partial pressure of the aluminium chloride are chosen as low as possible, so as to favour in the kinetics of the deposit, the diffusion of the reactive species compared with the surface alumina formation kinetics. Therefore, the deposition rate is controlled solely by the chemical reaction speed on the surface of the material.

These conditions make it possible to obtain a very uniform alumina layer, which adheres well, due to its capacity of perfectly adapting to all the surface irregularities of the underlying material. The values of the parameters best fulfilling these conditions are total pressure 4 KPa, aluminium chloride pressure 0.1 KPa and temperature 1000° C.

During cooling, cracks existing in the outer SiC layer form again and are then closed again during the use of the composite material as soon as the temperature reaches 1000° C. The alumina thickness deposited varies from 2 to 100 μm, as a function of the use conditions provided for the composite material.

According to the invention, the densification of the porous substrate can be carried out by pyrolysis of thermosetting resin with a high carbon content or gaseous hydrocarbon cracking with a view to obtaining a carbon matrix, or by slightly modifying these known processes with a view to obtaining a SiC-doped carbon matrix.

To this end, the silicon carbide supplied to the matrix, in the case of densification by pyrolysis of a thermosetting resin, is obtained by grafting onto the molecules of the polymer functional groups having Si—O bonds, the latter supplying during the thermal pyrolysis treatments the silicon carbide divided to the molecule scale. Advantageously, use is made of a carbon-containing polymer having 6 to 25% by weight (measured in $SiO_2$) and in particular 10% of functions of the silicone type (Si—O bonds).

Examples of pyrolyzable polymers are phenolic resins of the resol type and furan resins on which the silicone functions have been grafted by chemical reaction.

The densification by modified thermosetting resin involves several cycles each consisting of the impregnation by the resin, polymerization followed by a thermal stabilization treatment of the resin, pyrolysis with a view to transforming the resin into hard coke and then a high temperature heat treatment to transform the Si—O groups into silicon carbide.

It is also possible to form the composite C/SiC matrix by CVD involving the high temperature cracking of a mixture formed by at least one hydrocarbon and at least one organosilane, which may or may not be substituted by at least one halogen. The hydrocarbons and organosilanes which can be used are those referred to hereinbefore. The organosilane percentage varies between 1 and 8% by weight. It is dependent on the respective reactivity of the gases or vapours and/or temperatures (980° to 1100° C.), as well as the pressures (0.5 to 50 KPa) used.

Advantageously, each fibre of the substrate is coated with a thin silicon carbide film with a thickness of 100 to 200 nm, in order to retain the deformability of the substrate for its shaping. Thus, the shaping is generally performed following SiC deposition on the fibres, although it can take place before the SiC is deposited on the fibres. This SiC coating on the fibres is deposited by CVD using gaseous mixtures and conditions given for the SiC sealing of the outer layer.

The use of silicon carbide on the surface of the substrate fibres and in the matrix gives an anti-oxidation protection, whilst greatly slowing down the core oxidation of the composite carbon-carbon material in the case of accidental destruction or flaking of the outer SiC layer. Thus, the characteristics and effectiveness of the composite material are ensured, at least up to the end of the mission in question. Thus, under certain particularly difficult conditions, the outer SiC layer could be broken, e.g. under the effect of an impact, a vibration or friction occurring, in the particular case of the space field, during a flight of the vehicle.

The slowing down of the penetration of oxygen into the matrix, in the case of an accidental oxygen penetration, is particularly due to the preferred high temperature oxidation (above 1600° C.) of the silicon carbide compared with the carbon. This oxidation of the SiC leads to silicon dioxide, which involves an increase in the volume of the matrix in proportion to the SiC level therein. This volume increase associated with the melting of the silica (above 1300° C.) closes the cracks and pores in the carbon matrix which may be present, thus greatly slowing down the penetration of the oxygen to the core of the composite material and therefore its oxidation.

The preferred oxidation of the SiC of the matrix only takes place if it is in very highly divided form (the size of the grains must be of the same order of magnitude as the thickness of the $SiO_2$ coating covering each grain, i.e. <50 mm).

According to the invention, the surface of each carbon fibre must be provided with a pyrolytic carbon coating in contact with the thin SiC film covering the said fibres. This pyrolytic carbon coating can be deposited prior to the SiC film covering the fibres, or following the deposition thereof. This pyrolytic carbon coating constitutes an interface for preserving, or even improving the mechanical properties of the composite material.

Other features and advantages of the invention can be gathered from the following illustrative and non-limitative description with reference to the drawings, wherein show:

FIG. 1 Diagrammatically and in cross-section, a composite material according to the invention.

Figure 2:
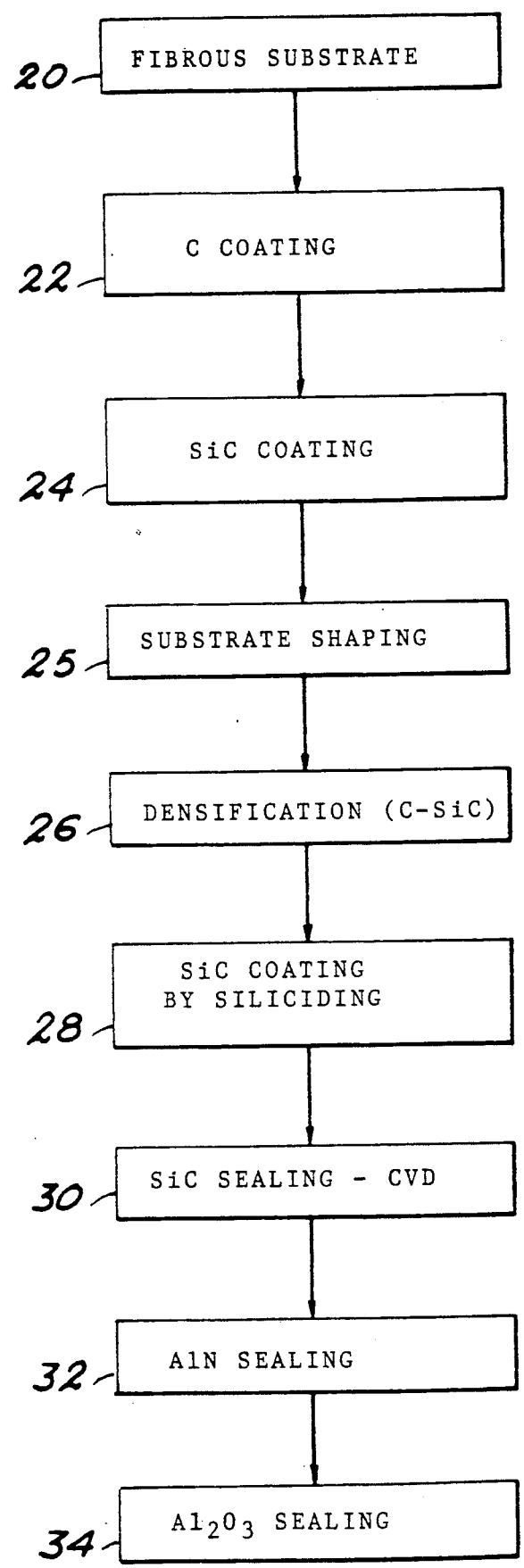

FIG. 2 A diagram illustrating the different stages of the process for producing the material according to the invention.

FIG. 1 shows a composite carbon-carbon material having carbon reinforcing fibres 2 embedded in a pyrolytic carbon matrix 4 containing at the most 20% and e.g. 2 to 10% by weight of silicon carbide greatly reducing the oxidizability of the carbon matrix. The fibres 2 are woven in three orthogonal dimensions and have an approximate thickness of 8 μm.

Each fibre 2 is coated with an extremely thin anisotropic pyrolytic carbon film with a thickness of at the most equal to 100 nm and preferably between 50 and 100 nm. Moreover, a silicon carbide coating 8 with a thickness of approximately 100 to 200 nm protects each fibre 2 against any oxidation by slowing down oxygen diffusion. This silicon carbide coating can be placed in direct contact with the fibre 2, or can cover the pyrolytic carbon coating 6.

The composite material according to the invention is covered with an outer silicon carbide layer 10 with a thickness of 200 to 600 μm. When the said outer layer 10 is obtained by siliciding it is associated with an underlying layer 13 of a carbon fibre-SiC matrix composite with a thickness of 20 to 200 μm. In other words, the outer layer 10 extends beyond the first row of fibres of the matrix 4 (or the second row) shown in mixed line form.

This continuity of the composite material, where there is a progressive passage from the carbon-carbon composite to the carbon-silicon carbide composite, ensures a good adhesion of the outer SiC layer 10.

The cracks 12 in the outer SiC layer 10 are sealed by a 2 to 10 μm thick SiC coating 14. This SiC sealing coating 14 is completed by a nitride coating 16 and in particular a coating of aluminium nitride, boron nitride or hafnium nitride with a thickness of 200 to 3000 nm, as a function of the material used.

The composite material according to the invention is coated with a final alpha alumina layer 18 with a thickness of 2 to 100 μm.

Examples will now be given of the production of the composite material according to the invention shown in FIG. 1.

EXAMPLE 1

This production example will be described with reference to FIG. 2.

The first stage of the process, as represented by block 20, consists of forming a deformable porous carbon structure by weaving carbon fibre wicks in three orthogonal dimensions in per se known manner. These fibre wicks are formed from approximately 3000 PAN filaments with a high modulus of type M40-Toray.

The second stage of the process, as represented by block 22, consists of depositing a 80 nm thick pyrolytic carbon, anisotropic coating on each fibre. This pyrolytic carbon is formed by chemical vapour phase deposition in an isothermal furnace heated to 1100° C., in which methane circulates under a pressure of 1.5 KPa for one hour.

The following stage of the process, represented by block 24, consists of depositing an approximately 150 nm thick SiC coating by CVD using a mixture of trichloromethyl silane and hydrogen raised to 900° C. in a ratio of $[H_2]:[CH_3SiCl_3]$ of 8 at a pressure of 10 mPa for 10 hours.

The thus obtained substrate is then shaped, as indicated at 25, followed by densification with a view to forming a SiC-doped carbon matrix, as indicated by block 26 in FIG. 2. To this end, the substrate undergoes vacuum impregnation by a phenolic resin of the resol type and onto which have been chemically grafted 10% silicone functions. This impregnation takes place in vacuo (pressure below 1 KPa).

The impregnated structure is then polymerized at atmospheric pressure to a temperature of 200° C. and then the crust is removed, so as to take away excess resin. This is followed by a pyrolysis of the resin in a neutral medium at about 800° C., in order to convert the crosslinked polymer into hard coke (vitreous carbon). A subsequent heat treatment at between 1200° and 1800° C. makes it possible to convert the Si—O bonds of the polymer into SiC.

This treatment phase involving the impregnation, polymerization, pyrolysis and subsequent thermal treatment is carried out five times in succession. The composite material then reaches a density of 1.45 to 1.5.

After machining, the parts to be silicided (shaped substrates) are immersed in a mixture of powders containing by weight 10% $Al_2O_3$, 30% Si and 60% SiC. These powders have a grain size distribution of 30 to 60 μm and an apparent density, after compression, of 1. Siliciding is carried out in a graphite crucible.

The crucible with its charge then undergoes a heat treatment at 1700° C., under an argon atmosphere for 1 hour. In this way a 300 to 500 μm thick SiC surface layer 10 is formed. This siliciding stage is represented by block 28 in FIG. 2.

The parts, following the removal of their powder matrix, are cleaned and checked (weighing, measuring the thickness of the outer SiC layer by eddy current) before receiving the chemical vapour phase deposit of SiC 14.

For this purpose, the parts are placed in the aforementioned isothermal furnace kept at 950° C., in which there is a circulation under 1 KPa of a mixture of trichloromethyl silane and hydrogen in a ratio $[H_2]:[CH_3SiCL_3]$ of 8 for twice 2 hours. The parts are turned over after the first 2 hours, in order to carry out an approximately 5 μm SiC deposit 16 on all the visible surfaces of the parts. This stage is represented by block 30 in FIG. 2.

Following this cycle, the parts undergo chemical vapour phase deposition of an aluminium nitride coating 16. This stage is shown by block 32 in FIG. 2.

This deposition takes place at 950° C., in the same isothermal furnace as hereinbefore in which circulates under 5 KPa, a mixture of aluminium chloride ($AlCl_3$), hydrogen and ammonia under argon scavenging. The partial pressures of these different gases are given in the following tabulation:

| | |
|---|---|
| $H_2$ | 3 KPa |
| $NH_3$ | 0.6 KPa |
| $AlCl_3$ | 0.1 KPa |
| Ar | 1.3 KPa |

Deposition takes place in two cycles of 2 hours. The average thickness of the aluminium nitride coating is 1.5 μm.

On said aluminium nitride barrier coating is then deposited by CVD the outer protective alumina coating 18. This stage is represented by block 34. The reaction is performed at 950° C. in the aforementioned furnace under 5 KPa using a mixture of 1% $AlCl_3$, 49.5% $H_2O$ and 49.5% of $CO_2$ by volume. An alumina deposit of approximately 5 μm is obtained in two cycles of 3 hours.

EXAMPLE 2

This example differs from example 1 by the deposition of a hafnium nitride coating in place of an aluminium nitride coating. The other stages are performed as in example 1.

HfN deposition takes place by reactive spraying or sputtering under a nitrogen atmosphere. This gives a 500 nm hafnium nitride coating adhering perfectly to the silicon carbide.

EXAMPLE 3

This example differs from example 1 through the nature of the porous substrate. The other operations are identical to those of example 1. This example uses a bidimensional substrate formed by draping M 40 Toray carbon fibre fabrics, which have been preimpregnated by a phenolic resin. After draping on a mould, the part is placed under a bag in which a vacuum is produced. Baking takes place in the autoclave under 1 MPa up to 150° C. Following removal from the mould and post-baking at about 200° C., the structure obtained undergoes pyrolysis and the subsequent heat treatment already described in example 1. The part obtained then undergoes densification by the 5 phases of example 1.

EXAMPLE 4

This example uses a porous substrate formed by weaving, in accordance with the three orthogonal directions, of high strength Toray T 300 type fibres.

Following the deposition of the carbon coating and the SiC coating on the fibres, as described in example 1, densification of the substrate takes place by immersion in coal tar followed by pyrolysis at an isostatic pressure of 100 MPa and at 800° C. This leads to a matrix formed solely from carbon. This coke matrix is not graphitized. The final density of the composite material is then 1.8 after 6 densification cycles.

After machining, the parts are silicided in a mixture of powders containing 75% by weight SiC and 25% by weight $SiO_2$. Siliciding is performed as in example 1 at 1650° C., under a nitrogen atmosphere and for 1 hour. The other operations are the same as in example 1.

EXAMPLE 5

This example differs from example 1 by the procedure of depositing an aluminium nitride barrier coating.

In this example, there is firstly a deposition of a 1 μm aluminium coating by reactive cathodic sputtering. The part is then placed in a nitriding furnace, where progressive heating takes place under a nitrogen atmosphere. Nitriding commences at about 600° C. and then the part is progressively heated to 1200° C., which is the temperature at which complete consolidation of the aluminium nitride coating takes place.

The above examples relate to the thermal protection of aircraft reentering the atmosphere at high speed. Obviously the composite material according to the invention can be used in all industrial fields, where it is wished to have a refractory or stainless material retaining good mechanical properties at above 1100° C. in a corrosive and in particular oxidizing medium. Moreover, as a function of the envisaged application, the duration of the deposits and the heat treatments, their thickness and their number could be modified. Furthermore, the order of the stages of the process can be modified. In particular, the shaping of the substrate can take place before or after the pyrolytic carbon and/or SiC deposition on the fibres.

I claim:

1. A composite material incorporating a carbon fiber substrate (2) embedded in a binding material (4), an outer silicon carbide layer (10) for covering the substrate and the binding material, an outer oxide coating (18) selected from the group consisting of $ThO_2$, $ZrO_2$, $HfO_2$, $La_2O_3$, $Y_2O_3$, and $Al_2O_3$ and covering the outer layer, and an intermediate coating (16) of a compound substantially nonreactive with the silicon carbide layer and the oxide coating so as to serve as a reaction barrier therebetween.

2. A composite material incorporating a carbon fiber substrate (2) embedded in a binding material (4), an outer silicon carbide layer (10) for covering the substrate and the binding material, an outer oxide coating (18) covering the outer layer and an intermediate coating (16) serving as a reaction barrier between the silicon carbide layer and the oxide coating, said intermediate coating (16) being selected from the group consisting of HfC, TaC, ZrC, $W_2C$, NbC, $ThC_2$, $ZrB_2$, $HfB_2$, $TiB_2$, BN, HfN, ZrN, AlN, Pt, Ir, Os, Rh and Ru.

3. A composite material incorporating a carbon fiber substrate (2) embedded in a binding material (4), an outer silicon carbide layer (10) for covering the substrate and the binding material, an outer oxide coating (18) selected from the group consisting of $ThO_2$, $ZrO_2$, $HfO_2$, $La_2O_3$, $Y_2O_3$ and $Al_2O_3$ and covering the outer layer and an intermediate coating (16) serving as the reaction barrier between the silicon carbide layer and the oxide coating, said intermediate coating (16) being selected from the group consisting of HfC, TaC, ZrC, $W_2C$, NbC, $ThC_2$, $ZrB_2$, $TiB_2$, BN, HfN, ZrN, AlN, Pt, Ir, Os, Rh and Ru.

4. The composite material according to claims 1 or 2, characterized in that the oxide coating is alumina.

5. The composite material according to claims 1 or 2, characterized in that the intermediate coating (16) is a nitride.

6. The composite material according to claims 1 or 2, characterized in that the intermediate coating (16) is a material selected from the group consisting of aluminum nitride and hafnium nitride.

7. The composite material according to claims 1 or 2, characterized in that a silicon carbide sealing coating (14) is provided for sealing cracks of the outer layer (10).

8. The composite material according to claims 1 or 2, comprising a silicon carbide sealing coating (14) for sealing cracks of the outer layer (10), an intermediate coating (16) of hafnium or aluminum nitride covering the sealing coating, and an alumina coating (18) constituting the outermost layer of the material.

9. The composite material according to claims 1 or 2, characterized in that the binding material (4) is selected from the group consisting of carbon or carbon doped with silicon carbide.

10. The composite material according to claims 1 or 2, characterized in that each fiber (2) is coated with a silicon carbide film (6).

11. The composite material according to claims 1 or 2, characterized in that each fiber (2) is coated with a pyrolytic carbon film (8).

12. The composite material according to claims 1 or 2, characterized in that an underlying carbon-silicon carbide composite layer (13) is provided beneath the outer layer (10).

13. The composite material according to claims 1 or 2, characterized in that the outer layer (10) has a thickness from 200 to 600 μm.

14. The composite material according to claims 1 or 2, characterized in that the oxide coating (18) has a thickness from 2 to 100 μm.

15. The composite material according to claims 1 or 2, characterized in that the intermediate coating (16) has a thickness from 0.5 to 5 μm.

16. The composite material according to claim 7, characterized in that the sealing coating (14) has a thickness from 2 to 10 μm.

17. The composite material according to claim 10, characterized in that the silicon carbide film (6) has a thickness from 100 to 200 nm.

18. The composite material according to claim 11, characterized in that the pyrolytic carbon film (8) has a thickness from 50 to 100 nm.

* * * * *